(12) United States Patent
Tomizawa

(10) Patent No.: US 7,565,240 B2
(45) Date of Patent: Jul. 21, 2009

(54) NAVIGATION DEVICE, METHOD, AND PROGRAM

(75) Inventor: Katsumi Tomizawa, Chofu (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 11/667,956

(22) PCT Filed: Nov. 28, 2005

(86) PCT No.: PCT/JP2005/022234

§ 371 (c)(1),
(2), (4) Date: May 17, 2007

(87) PCT Pub. No.: WO2006/059742

PCT Pub. Date: Jun. 8, 2006

(65) Prior Publication Data

US 2008/0010007 A1    Jan. 10, 2008

(30) Foreign Application Priority Data

Nov. 30, 2004  (JP)  ............................. 2004-346671

(51) Int. Cl.
*G01C 21/34*  (2006.01)
(52) U.S. Cl. ..................... 701/202; 701/200; 701/207; 701/208; 701/214; 340/995.19; 340/995.24; 342/357.01; 342/357.06
(58) Field of Classification Search ......... 701/201–202, 701/214, 206, 207–208, 213; 340/995.19, 340/995.24, 988, 357.06, 425.5; 342/357.01, 342/357.06
See application file for complete search history.

(56) References Cited

U.S. PATENT DOCUMENTS 4,413,322 A * 11/1983 Foster et al. ................. 701/206

(Continued)

FOREIGN PATENT DOCUMENTS

CN    101040554 A  *  9/2007

(Continued)

OTHER PUBLICATIONS

Stereo vision and rover navigation software for planetary exploration; Goldberg, S.B.,Maimone, M.W.,Matthies, L.; Indelible Syst., Northridge, CA, USA; Aerospace Conference Proceedings, 2002. IEEE; Publication Date: 2002; vol. 5, On pp. 5-2025-5-2036 vol. 5; ISSN: 0-7803-7231-X; INSPEC Accession No. 75350.*

(Continued)

*Primary Examiner*—Cuong H Nguyen
(74) *Attorney, Agent, or Firm*—Eric J. Robinson; Robinson Intellectual Property Law Office, P.C.

(57) ABSTRACT

In a navigation device, a destination waypoint is set by a user through an input section (13), and, when guidance to the destination waypoint is started, a control section (11) stores positional information on the destination waypoint into a destination waypoint history table (21) of a storage section (12) at predetermined timing, the destination waypoint history table (21) storing positional information on destination waypoints. Stored information is displayed on a display section (14) when the user sets a destination waypoint. The user can select a destination waypoint based on the displayed information and set the destination waypoint. After the destination waypoint is set, only the destination waypoint satisfying predetermined conditions is stored.

5 Claims, 5 Drawing Sheets

U.S. PATENT DOCUMENTS

| | | | |
|---|---|---|---|
| 5,337,244 | A | 8/1994 | Nobe et al. |
| 5,422,814 | A * | 6/1995 | Sprague et al. ............. 701/213 |
| 5,543,802 | A * | 8/1996 | Villevieille et al. .... 342/357.06 |
| 5,559,707 | A * | 9/1996 | DeLorme et al. ............ 701/200 |
| 5,802,492 | A * | 9/1998 | DeLorme et al. ......... 455/456.5 |
| 5,884,213 | A * | 3/1999 | Carlson ..................... 701/206 |
| 5,948,040 | A * | 9/1999 | DeLorme et al. ............ 701/201 |
| 6,115,669 | A * | 9/2000 | Watanabe et al. ........... 701/209 |
| 6,266,614 | B1 * | 7/2001 | Alumbaugh ................ 701/211 |
| 6,278,938 | B1 * | 8/2001 | Alumbaugh ................ 701/208 |
| 6,298,303 | B1 * | 10/2001 | Khavakh et al. ............ 701/209 |
| 6,321,158 | B1 * | 11/2001 | DeLorme et al. ............ 701/201 |
| 6,393,346 | B1 * | 5/2002 | Keith et al. ................... 701/35 |
| 6,415,224 | B1 | 7/2002 | Wako et al. |
| 6,600,994 | B1 | 7/2003 | Polidi |
| 6,810,323 | B1 * | 10/2004 | Bullock et al. .............. 701/206 |
| 6,826,472 | B1 * | 11/2004 | Kamei et al. ................ 701/202 |
| 2002/0065606 | A1 | 5/2002 | Kawai et al. |
| 2004/0260466 | A1 | 12/2004 | Ichihara et al. |

FOREIGN PATENT DOCUMENTS

| | | |
|---|---|---|
| DE | 198 39 378 | 3/2000 |
| EP | 0 508 681 | 10/1992 |
| EP | 0 747 835 | 12/1996 |
| EP | 1 467 182 | 10/2004 |
| JP | 04-314082 | 11/1992 |
| JP | 04314082 A * | 11/1992 |
| JP | 07-083678 | 3/1995 |
| JP | 2002-168645 | 6/2002 |
| JP | 2002168645 A * | 6/2002 |
| JP | 2003-317189 | 11/2003 |
| JP | 2003317189 A * | 11/2003 |
| JP | 2004-309368 | 11/2004 |
| JP | 2006023161 A * | 1/2006 |
| JP | 2006125880 A * | 5/2006 |
| JP | 2006201180 A * | 8/2006 |
| JP | 2006201181 A * | 8/2006 |
| JP | 2006208157 A * | 8/2006 |
| WO | WO 2000/012967 | 3/2000 |
| WO | WO 2006040901 A1 * | 4/2006 |

OTHER PUBLICATIONS

Navigation system for visual impaired persons based on satellital location;Perez-Ponce, H. Hernandez-Rodriguez, P.R. Departamento de Ingenieria Etectrica, CINVESTAV-IPN, Mexico City, Mexico; Engineering in Medicine and Biology Society, 2004. IEMBS '04. 26th Annual International Conference of the IEEE.*

Vision-aided inertial navigation;Roberts, B.A. Vallot, L.C. ;Honeywell Syst. & Res. Center, Minneapolis, MN ; Position Location and Navigation Symposium, 1990. Record. The 1990's—A Decade of Excellence in the Navigation Sciences. IEEE Plans '90., IEEE; Mar. 20-23, 1990; pp. 347-352.*

Navigation of decentralized autonomous automatic guided vehicles in material handling;Berman, S. Edan, Y. Jamshidi, M. Dept. of Ind. Eng. & Manage., Ben-Gurion Univ. of the Negev, Beer-Sheva, Israel; Robotics and Automation, IEEE Transactions on; Aug. 2003; vol. 19, Issue: 4; pp. 743-749.*

Enhanced Delivery in Disruption Tolerant Networks using Advantaged Nodes with Directional Antenna Capability; Chuah, M.; Xi,Y.; Military Communications Conference, 2007. MILCOM 2007. IEEE; Oct. 29-31, 2007 pp. 1-6, Digital Object Identifier 10.1109/MILCOM.2007.4455102.*

Power-Aware Routing Algorithm Based on Mobile Agents (PARAMA) in Mobile Ad Hoc Networks; Yi Zhang; Li Feng; Wei Chen; Lina Zhu; Embedded Software and Systems Symposia, 2008. ICESS Symposia '08. International Conference on; Jul. 29-31, 2008 pp. 312-317; Digital Object Identifier 10.1109/ICESS.Symposia. 2008.92.*

HRPMA: A Hybrid Routing Protocol Based on Mobile Agent for Wireless Ad Hoc Networks; ZhangYi; Wang Xiaofei; Zhang Xiumei; Feng Li; Communications and Mobile Computing, 2009. CMC '09. WRI International Conference on; vol. 2, Jan. 6-8, 2009 pp. 137-141; Digital Object Identifier 10.1109/CMC.2009.243.*

Shortest path routing in partially connected ad hoc networks; Kun Tan; Qian Zhang; Wenwu Zhu; Global Telecommunications Conference, 2003. GLOBECOM '03. IEEE; vol. 2, Dec. 1-5, 2003 pp. 1038-1042 vol. 2; Digital Object Identifier 10.1109/GLOCOM.2003. 1258396.*

International Search Report for Application No. PCT/JP2005/022234.

International Preliminary Examination Report (Application No. PCT/JP2005/022234) dated Jun. 14, 2007.

Office Action (Japanese Application No. 2004-346671) dated Apr. 15, 2008.

Supplementary European Search Report (Application No. 05811309.3) Dated Apr. 6, 2009.

* cited by examiner

FIG. 2

21 DESTINATION WAYPOINT HISTORY TABLE

| REGISTRATION DATE | X | Y | LATEST DATE WHEN DATA WAS USED | ... |
|---|---|---|---|---|
| 2004/10/3 | 35.11.01 | 139.01.09 | 2004/10/3 | ... |
| 2004/8/10 | 34.51.11 | 138.55.33 | 2004/9/9 | ... |
| 2004/3/1 | 34.45.15 | 138.49.43 | 2004/3/1 | ... |
| 2003/4/12 | 34.40.17 | 138.57.15 | 2004/4/26 | ... |
| ... | ... | ... | ... | ... |

FIG. 3

| REGISTRATION DATE | DESTINATION WAYPOINTS |
|---|---|
| 2004/1/3 | ○○ NEIGHBORHOOD |
| 2004/2/10 | △△ NEIGHBORHOOD |
| 2004/3/1 | □□ |
| 2004/4/12 | ×× NEIGHBORHOOD |
| ... | ... |

FIG. 5

| REGISTRATION DATE | X | Y | THE NUMBER OF TIMES DATA WAS USED |
|---|---|---|---|
| 2004/1/3 | 35.11.01 | 139.01.09 | 2 |
| 2004/2/10 | 34.51.11 | 138.55.33 | 1 |
| 2004/3/1 | 34.45.15 | 138.49.43 | 4 |
| 2004/4/12 | 34.40.17 | 138.57.15 | 3 |
| ... | ... | ... | ... |

NAVIGATION DEVICE, METHOD, AND PROGRAM

TECHNICAL FIELD

The present invention relates to a navigation device and method.

BACKGROUND ART

In a navigation device which can store destination waypoints set by a user and use the destination waypoints when destination waypoints are set on another occasion, a technique is known in which the coordinates of a destination waypoint are stored in a memory without guiding to the set destination waypoint each time destination waypoints are set (refer to, for example, Japanese Patent No. 2891794). In the technique, the number of the coordinates of a destination waypoint that can be stored is determined in advance. If the number exceeds the maximum value thereof, the coordinates of a destination waypoint are sequentially overwritten on the earliest set coordinates of a destination waypoint.

In the technique disclosed in Japanese Patent No. 2891794, the coordinates of a destination waypoint are stored in a history only by setting destination waypoints. For this reason, even destination waypoints which are less necessary for a user to keep in a history are stored (for example, although destination waypoints were set, they were actually not used as guidance.)

In the technique disclosed in Japanese Patent No. 2891794, the history of destination waypoints used for a user who determines routes to destination waypoints while setting a large number of destination waypoints is filled with data before long. As a result, data is sequentially overwritten on the earlier set coordinates of destination waypoints, and only the later set history of destination waypoints is left. For this reason, the history of destination waypoints is less frequently used except for a user who often goes to the same place. Thus, the technique is not easy to use for a user.

The present invention has been made in view of the above problems and has for its purpose to provide a user-friendly navigation device and method.

Further, it is another purpose of the present invention to provide a navigation device and method capable of storing and reusing destination waypoints useful for a user.

It is still another purpose of the present invention to provide a navigation device and method capable of storing positional information on destination waypoints which are necessary for a user to keep in a history, for example, on destination waypoints to which a user was actually guided.

DISCLOSURE OF THE INVENTION

To achieve the above purpose, a navigation device, in a first aspect of the present invention, for providing guidance from a user's current location to a set destination waypoint is characterized by including:
destination waypoint setting means for setting destination waypoints;
history storing means for storing positional information on the set destination waypoints therein;
storage controlling means for storing positional information on destination waypoints in the history storing means at a predetermined timing when destination waypoints are set by the destination waypoint setting means and guidance starts;
displaying means for displaying the positional information stored in the history storing means; and
destination waypoint selecting means for selecting destination waypoints out of the displayed positional information.

The predetermined timing refers to, for example, a timing when guidance starts for the set destination waypoint, a timing when a vehicle reaches a predetermined spot on the route to the destination waypoint, a timing when a predetermined time has passed since guidance started for the set destination waypoint. In this case, the history storing means determines whether each timing is reached and stores positional information on the set destination waypoints therein.

Any of the predetermined plural timings may be selected in response to user's instructions.

To achieve the above purpose, a navigation method in a second aspect of the present invention is characterized by including the steps of:
setting destination waypoints;
controlling the storage of positional information on destination waypoints in the history storing area for storing positional information on set destination waypoints at a predetermined timing when destination waypoints are set at the step of the setting destination waypoints and guidance starts; displaying the positional information stored in the history storing means; and
selecting destination waypoints out of the displayed positional information.

To achieve the above purpose, a program, in a third aspect of the present invention, causes a computer to function as:
destination waypoint setting means for setting destination waypoints;
history storing means for storing positional information on the set destination waypoints therein;
storage controlling means for storing positional information on destination waypoints in the history storing means at a predetermined timing when destination waypoints are set by the destination waypoint setting means and guidance starts; displaying means for displaying the positional information stored in the history storing means; and
destination waypoint selecting means for selecting destination waypoints out of the displayed positional information.

According to the present invention, out of the set destination waypoints, destination waypoints which are merely set are not stored, but destination waypoints which are set in advance are stored provided only that a guidance actually starts and a predetermined timing is reached. For this reason, only destination waypoints useful for a user are stored and reused.

BRIEF DESCRIPTION OF THE DRAWING

FIG. 2 is an example of a destination waypoint history table;
FIG. 3 is an example of a display section by which a user selects destination waypoints from a destination waypoint history;
FIG. 5 is an example of the destination waypoint history table in which the number of times the destination waypoint history has been used is associated with other data.

BEST MODES FOR CARRYING OUT THE INVENTION

A navigation device 1 according to the present embodiment of the present invention is described with reference to the drawings. In the present embodiment, a car navigation device, in particular, is cited as an example.

Figure 1:
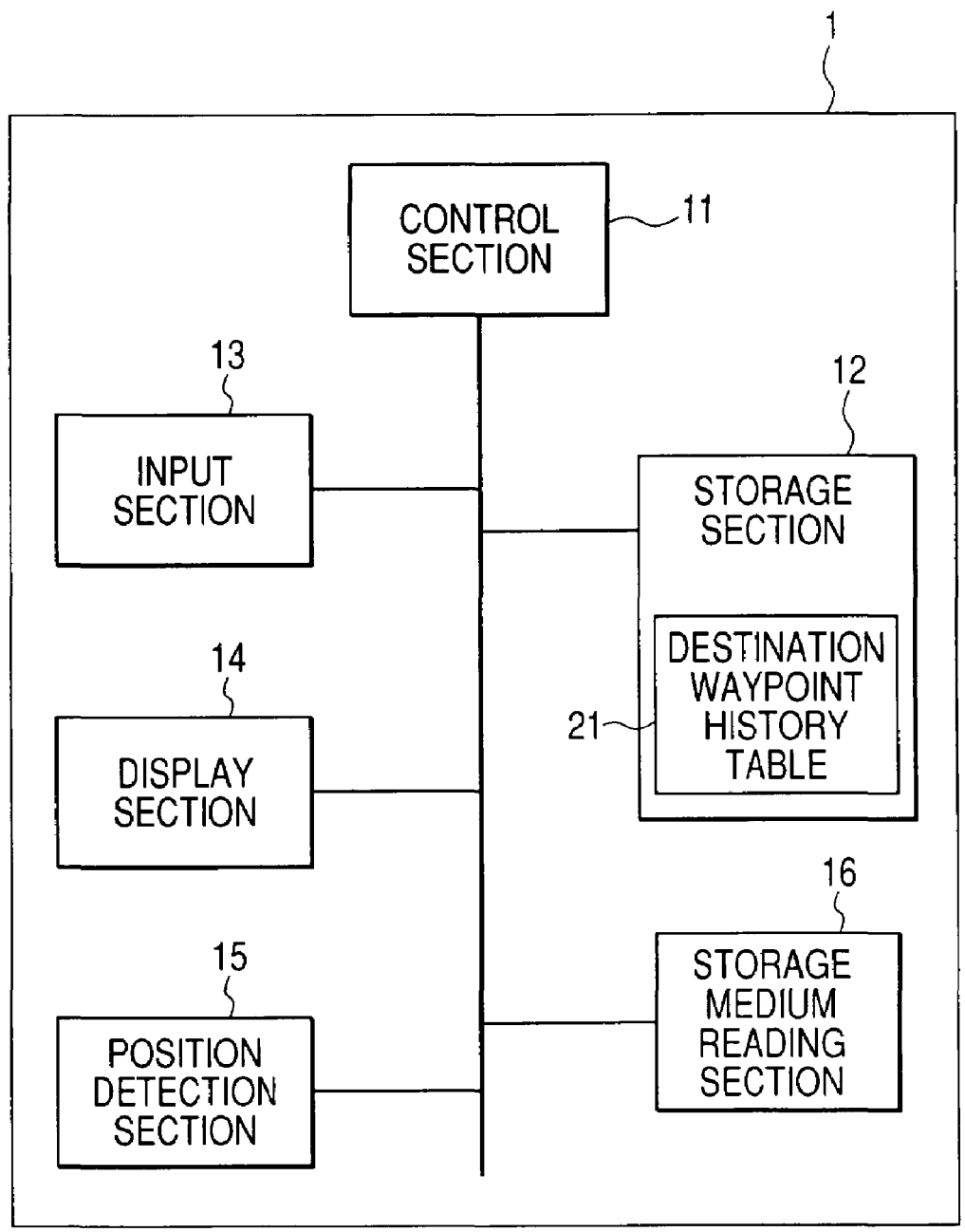
FIG. 1 is a block diagram of an example of configuration of a navigation device.

As illustrated in FIG. 1, the navigation device 1 according to the present embodiment of the present invention includes a control section 11, storage section 12, input section 13, display section 14, position detection section 15 and storage medium reading section 16.

The control section 11 is formed of a central processing unit (CPU), read only memory (ROM) and random access memory (RAM) and controls the entire navigation device 1. The control section 11 reads and executes programs prestored in the storage section 12, for example, to compute the route from a user's current location to a destination waypoint and perform navigation on the basis of the current location and route.

The storage section 12 includes, for example, a hard disc device and DVD-RAM. The storage section 12 stores an operation program by which the control section 11 executes operations, various kinds of data required for processing and destination waypoint history table 21.

As illustrated in FIG. 2, the destination waypoint history table 21 stores such information as destination waypoints, dates when the destination waypoints were registered and the latest dates when the destination waypoints were used, with the information associated with each other. The number of positional information on destination waypoints stored in the destination waypoint history table 21 is determined in advance. If the number exceeds the maximum value thereof, the information on destination waypoints is sequentially overwritten on the earliest stored information on destination waypoints.

The control section 11 reads information stored in the destination waypoint history table 21 from the storage section 12 and displays it on the display section 14 as shown in FIG. 3. At this point, the control section 11 converts the positional information to geographic names and neighboring facility names and displays them in association with dates when destination waypoints were set. A user can indicate a geographic point or set neighboring facilities retrieved by a facility retrieval as a destination waypoint and select any information from the historical information on destination waypoints shown in FIG. 3 through the input section 13 as a destination waypoint.

The input section 13 is formed of an input device, such as, a keyboard and transmits an input data to the control section 11. The input section 13 may be formed of a touch panel, in that case, the input section 13 and the display section 14 are superposed on each other.

The display section 14 is formed of a display device such as, a liquid crystal display device and displays information according to instructions from the control section 11.

The position detection section 15 is formed of a ground positioning system (GPS) and a geomagnetic sensor, and identifies a user's current location to transmit information on the current location, for example, on latitude and longitude to the control section 11. The control section 11 stores positional information in the storage section 12.

The storage medium reading section 16 is formed of a compact disc (CD) drive and digital versatile disc (DVD) drive and reads geographical map information prestored in a recording medium, such as, CD and DVD. The storage medium reading section 16 transmits the read information to the control section 11.

The control section 11 causes the display section 14 to display a user's current location and guide a route on the basis of the geographical map information read from the storage medium reading section 16 and positional information on the current location obtained from the position detection section 15.

The operation of the navigation device 1 is described below.

Figure 4:
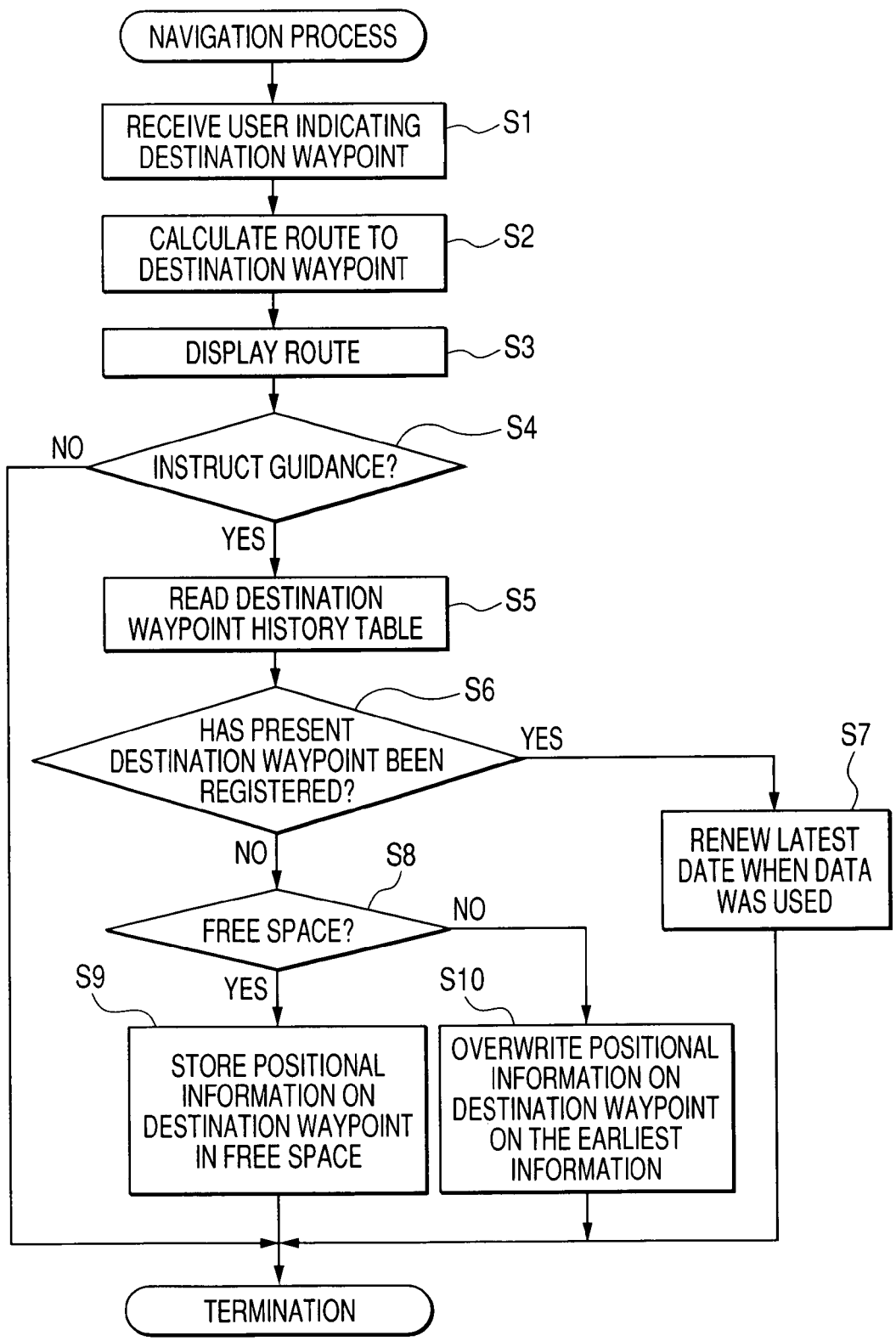
FIG. 4 is a flow chart illustrating a navigation process.

User's indicating destination waypoint in the navigation device 1 through the input section 13 causes the control section 11 to start a navigation process shown in FIG. 4.

When the control section 11 starts a navigation process, the control section 11 receives user's indication as to destination waypoints and stores it in the storage section 12 at step S1.

Usable methods of indicating destination waypoints include: 1) a method of user indicating destination waypoints on the geographic map displayed on the display section 14; and 2) a method of user retrieving candidates using its desired neighboring facilities or phone numbers to display a list of them on the display section 14 to select destination waypoints out of the candidates in the list. It is allowable that historical information on destination waypoints stored in the destination waypoint history table 21 of the storage section 12 is read to convert latitude and longitude to general local names. Then, the general local names are associated with dates (the latest dates when data was used) as shown in FIG. 3 and displayed on the display section 14 to select destination waypoints out of the history of destination waypoints. When the historical information shown in FIG. 3 is used, a colored cursor on the screen is moved through the input section 13 to select destination waypoints. Depressing a decision button which is not shown selects and sets destination waypoints.

When destination waypoints are set, the control section 11 executes a route search program for calculating a route from the user's current location to the destination waypoint stored in the storage section 12 to calculate one or a plurality of routes to the destination waypoint by using positional information on the current location supplied from the position detection section 15, positional information on the indicated destination waypoint and geographic information for navigation stored in the storage medium reading section 16 at step S2.

The control section 11 selects the route indicated by the user out of the calculated routes at step S3. The control section 11, for example, causes the display section 14 to display a plurality of upper candidates of calculated routes graded according to distance, time period and expense to cause a user to select any of the candidates. The route that the user has selected through the input section 13 is used as a guidance route and registered in the storage section 12.

The control section 11 is on standby until the user issues instructions as to the start of guidance to the route through the input section 13 at step S4.

When the user issues instructions as to the start of guidance to the route through the input section 13, (at step S4, Yes), the control section 11 reads the destination waypoint history table 21 from the storage section 12 at step S5.

A determination is made as to whether the destination waypoint set at this time has been stored in the destination waypoint history table 21 at step S6. If registered (at step S6, Yes), the latest date when the entered data was used is renewed with the date when guidance started at step S7. Then the process is terminated.

If it is determined that the destination waypoint has not been registered (at step S6, No), the control section 11 determines whether the destination waypoint history table 21 has free space at step S8.

If the destination waypoint history table 21 has free space (at step S8, Yes), positional information (X, Y) on destination waypoints indicated at step S1 is stored in the destination waypoint history table 21 as shown in FIG. 3 at step S9. In this case, the registered date and the latest date when data is used are taken to be the date when guidance starts.

On the other hand, if the destination waypoint history table 21 has no free space (at step S8, No), the control section 11 identifies the earliest date when data was used from data stored in the destination waypoint history table 21. The control section 11 then overwrites the positional information on the current destination waypoint and the date on the information identified as the earliest at step S10.

If the user does not issue instructions as to guidance to a destination waypoint (at step S4, No), the control section 11 does not store positional information on destination waypoint and terminates the process.

The above process enables the destination waypoint history table 21 to store only positional information on destination waypoints where an actual guidance has been performed, thereby realizing a navigation device in which the stored positional information can be reused to set destination waypoints.

In the above description, information on destination waypoints is stored in the destination waypoint history table 21, provided that a guidance to destination waypoints starts, but it is not limited to the above process. Information on destination waypoints may be stored in history table 21 when a vehicle reaches, for example, a predetermined point on the route to a destination waypoint or an intermediate point. In that case, the control section 11 calculates positional information on an intermediate point on the selected route at the time of starting guidance. Subsequently, if the control section 11 determines that positional information on a vehicle obtained from the position detection section 15 coincides with positional information on the intermediate point calculated in advance, the control section 11 stores positional information on the set destination waypoints in the destination waypoint history table 21.

After a certain time period has passed since guidance started, positional information on destination waypoints may be stored in the destination waypoint history table 21 of the storage section 12. In that case, the control section 11 stores time when guidance starts (or starts time) and stores positional information on the current destination waypoint in the destination waypoint history table 21 when the control section 11 has determined that a certain time passed.

A condition where the above positional information on destination waypoint is stored in the destination waypoint history table 21 is not always one. Some conditions may be presented to a user to select them. This allows a user to store only history of destination waypoints further required for the user.

The destination waypoint history table 21 is not limited to configuration shown in FIG. 2. As shown in FIG. 5, for example, not only the date when history has been stored is associated with the positional information, but also information showing how many times data has been used after positional information was stored may be associated with them. In that case, if the destination waypoint is set again by using the history of the destination waypoint, the number of times the history was used is incremented by one. If history information is erased, it may be erased in the order of less frequently used information.

In the above, although it is described that information on geographic map is stored in the storage medium, it is not limited to the above, information may be stored in the storage section 12. The input section is not limited to use of a keyboard and touch panel, but it may use speech therewith. In this case, the navigation device 1 further includes a speech input section formed of a microphone and a speech recognition section for analyzing and recognizing speech obtained through the speech input section as well as the input section 13.

INDUSTRIAL APPLICABILITY

The present invention is not limited to the above embodiment but various changes and applications can be made. For example, the present invention is not limited to a car navigation device, but may be applied to a general navigation device, such as, a navigation device mounted on a personal digital assistance (PDA), cellular phone and the like.

The present invention is not limited to a dedicated device, but it can be embodied using a general computer equipped with a GPS function. For example, a program causing a computer to execute all or a part of the process (in particular, steps S4 to S10) shown in FIG. 4 is stored in recording medium which can be read by a computer, such as, flexible disk, compact disk read-only memory (CD-ROM), digital versatile disk (DVD) and magneto optical disk (MO) and distributed, to install the program into another computer to run as the above means or execute the above process. Similarly, the program may be delivered and downloaded through a communication network.

The invention claimed is:

1. A navigation device for providing guidance from a user's current location to a set destination waypoint, characterized by comprising:

destination waypoint setting means for setting a destination waypoint;

history storing means for storing positional information on destination waypoints and the latest dates when the stored destination waypoints were used for guidance therein;

storage controlling means in response to an instruction for guidance start to the set destination waypoint, for checking the history storing means if the set destination waypoint is already stored in the history storing means, if yes, renewing the latest date (S7) for the set destination waypoint in the history storing means and if not, storing positional information on the set destination waypoint in the history storing means at a predetermined timing (S9);

displaying means for displaying the positional information stored in the history storing means; and destination waypoint selection means for selecting a destination waypoint with referring to the displayed positional information.

2. The navigation device according to claim 1, characterized in that the predetermined timing refers to a timing when guidance starts for the set destination waypoint and the history storing means determines whether guidance starts for the set destination waypoint and stores positional information on the set destination waypoints therein.

3. The navigation device according to claim 1, characterized in that the predetermined timing refers to a timing when a vehicle reaches a predetermined spot on the route to the destination waypoint and the storage controlling means determines whether the vehicle reaches the predetermined spot and stores positional information on the set destination waypoints in the history storing means.

4. A navigation device for providing guidance from a user's current location to a set destination waypoint, characterized by comprising:

destination waypoint setting means for setting destination waypoints;

history storing means for storing positional information on the set destination waypoints therein;

storage controlling means for storing positional information on destination waypoints in the history storing means at a predetermined timing when destination waypoints are set by the destination waypoint setting means and guidance starts;

displaying means for displaying the positional information stored in the history storing means; and destination waypoint selection means for selecting a destination waypoint with referring to the displayed positional information, further characterized in that the predetermined timing refers to a timing when a predetermined time has passed since guidance started for the set destination waypoint and the history storing means determines whether the predetermined time has passed and stores positional information on the set destination waypoints therein.

5. The navigation device according to claim 1, characterized in that the storage controlling means selects any of the predetermined plural timings in response to user's instructions and stores positional information on destination waypoints in the history storing means at the selected timing.

* * * * *